United States Patent
Moss et al.

(10) Patent No.: US 10,630,559 B2
(45) Date of Patent: Apr. 21, 2020

(54) VIRTUAL MACHINE (VM) REALM INTEGRATION AND MANAGEMENT

(71) Applicant: UST GLOBAL (SINGAPORE) PTE. LTD., Singapore (SG)

(72) Inventors: Simon Byford Moss, Cos Cob, CT (US); Douglas Wiley Bachelor, Groton, MA (US); Raul Hugo Curbelo, Sturbridge, MA (US); Elizabeth Winters Elkins, Pompano Beach, FL (US); Thomas C. Fountain, Madison, NJ (US)

(73) Assignee: UST Global (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/626,335

(22) Filed: Sep. 25, 2012

(65) Prior Publication Data

US 2013/0145367 A1 Jun. 6, 2013

Related U.S. Application Data

(60) Provisional application No. 61/539,588, filed on Sep. 27, 2011.

(51) Int. Cl.
*G06F 9/455* (2018.01)
*H04L 12/26* (2006.01)
(Continued)

(52) U.S. Cl.
CPC .......... *H04L 43/04* (2013.01); *G06F 9/45533* (2013.01); *G06F 9/45558* (2013.01);
(Continued)

(58) Field of Classification Search
CPC .............. G06G 9/45533; G06F 9/5077; G06F 9/45558; G06F 9/5072; H04L 43/04; H04L 41/0896
(Continued)

(56) References Cited

U.S. PATENT DOCUMENTS

| | | | |
|---|---|---|---|
| 6,253,282 B1 * | 6/2001 | Gish | ......................... G06F 8/24 709/203 |
| 7,685,083 B2 | 3/2010 | Fairweather | |

(Continued)

FOREIGN PATENT DOCUMENTS

| | | |
|---|---|---|
| JP | 2004-538542 | 12/2004 |
| JP | 2005-520224 | 7/2005 |
| JP | 2006-73007 | 3/2006 |

OTHER PUBLICATIONS

Amazon, Auto Scaling Developer Guide API Version Aug. 1, 2010, Aug. 1, 2010, Amazon Web Services.*
(Continued)

*Primary Examiner* — James J Lee
(74) *Attorney, Agent, or Firm* — Nixon Peabody LLP

(57) ABSTRACT

A hardware and operating system independent platform and/or run time architecture that implements a configuration and algorithmic based application and process for enabling multiple virtual machines or internal networked physical servers (hosts) to be organized into groups or "realms" in real time and against specific configurable metrics. The configurable metrics include one or more of the following; load or processing capacity availability, cost of CPU processing, location based on risk, importance to business continuity priority requirements, disaster recovery strength and priority, geographic location of host aligned to IP, and any other client specific or custom requirements. A realm manager balances all of these configurable metrics and creates an algorithm to address allocation. The algorithm is fully elastic, allowing for automatic opening and closing of virtual machines to accommodate any internal or external changes.

3 Claims, 3 Drawing Sheets

(51) Int. Cl.
  *H04L 12/24* (2006.01)
  *G06F 9/50* (2006.01)
(52) U.S. Cl.
  CPC ........ *G06F 9/5072* (2013.01); *H04L 41/0896* (2013.01); *G06F 2009/4557* (2013.01)
(58) Field of Classification Search
  USPC .......................................................... 718/1
  See application file for complete search history.

(56) References Cited

U.S. PATENT DOCUMENTS

| | | |
|---|---|---|
| 8,069,242 B2 | 11/2011 | Hadar et al. |
| 2002/0029340 A1 | 3/2002 | Pensak et al. |
| 2002/0121374 A1 | 9/2002 | Lee |
| 2002/0161624 A1 | 10/2002 | Bradlee |
| 2003/0033265 A1 | 2/2003 | Cabana et al. |
| 2003/0058277 A1 | 3/2003 | Bowman-Amuah |
| 2004/0122937 A1 | 6/2004 | Huang |
| 2005/0090908 A1 | 4/2005 | Tamura |
| 2005/0149459 A1 | 7/2005 | Kofman et al. |
| 2005/0234799 A1 | 10/2005 | Hansen et al. |
| 2005/0283658 A1* | 12/2005 | Clark ................. G06F 11/2028 714/11 |
| 2006/0184410 A1 | 8/2006 | Ramamurthy et al. |
| 2006/0242155 A1 | 10/2006 | Moore |
| 2007/0011485 A1* | 1/2007 | Oberlin ................. G06F 9/5055 714/4.1 |
| 2007/0078692 A1 | 4/2007 | Vyas |
| 2008/0052726 A1* | 2/2008 | Das ............................... 718/107 |
| 2008/0126410 A1* | 5/2008 | Brunswig et al. ......... 707/104.1 |
| 2008/0133287 A1 | 6/2008 | Slattery |
| 2009/0113049 A1 | 4/2009 | Nasle et al. |
| 2009/0254572 A1 | 10/2009 | Redlich |
| 2010/0064033 A1 | 3/2010 | Travostino et al. |
| 2010/0070448 A1 | 3/2010 | Omoigui |
| 2010/0070600 A1 | 3/2010 | Schulzrinne |
| 2010/0077205 A1 | 3/2010 | Ekstrom et al. |
| 2010/0189099 A1 | 7/2010 | Bae et al. |
| 2010/0250497 A1 | 9/2010 | Redlich |
| 2010/0293123 A1 | 11/2010 | Barrett et al. |
| 2010/0319004 A1* | 12/2010 | Hudson et al. ............... 719/313 |
| 2011/0107354 A1* | 5/2011 | Daherkar ................ G06F 9/542 719/318 |
| 2011/0131589 A1 | 6/2011 | Beaty et al. |
| 2011/0227754 A1 | 9/2011 | Hill |
| 2012/0102103 A1 | 4/2012 | Jacobson et al. |
| 2012/0198457 A1* | 8/2012 | Leonelli .................... G06F 8/34 718/102 |
| 2013/0086039 A1 | 4/2013 | Salch et al. |
| 2013/0086064 A1 | 4/2013 | Salch et al. |
| 2013/0091122 A1 | 4/2013 | Salch et al. |

OTHER PUBLICATIONS

International Search Report and Written Opinion, PCT/US10/46971, dated Nov. 23, 2010, 8 pages.
International Preliminary Report on Patentability, PCT/US10/46971, dated Feb. 28, 2012, 4 pages.
International Search Report and Written Opinion, PCT/US12/32726 dated Aug. 17, 2012, 6 pages.
International Preliminary Report on Patentability, PCT/US12/32726 dated Oct. 8, 2013, 5 pages.
International Search Report and Written Opinion, PCT/US2012/069483, dated Mar. 22, 2013, 7 pages.
Singapore Search Report, SG201201374-4 dated Oct. 4, 2013, 6 pages.
Singapore Written Opinion, SG201201374-4 dated Oct. 4, 2013, 10 pages.
Zhang et al., Migrating Legacy Applications to the Service Cloud, Object Oriented Programming, Systems, Languages and Applications (OOPSLA), 2009: Towards best practice in Cloud Computing. (2009) 59-68.
Sneed, Encapsulation of legacy software: A technique for reusing legacy software components, Annals of Software Engineering 9 (2000) 293-313.
International Search Report and Written Opinion, PCT/US2013/050673, dated Mar. 4, 2014, 7 pages.
XMLNews.org, XML Basics, 1999, available at http://web.archive.org/web/20120627074440/http://xmlnews.org/docs/xml-basics.html, 6 pages.
Japanese Notice of Reason(s) for Rejection, Translation, JP2012-527026, dated Feb. 4, 2014, 3 pages.

* cited by examiner

VIRTUAL MACHINE (VM) REALM INTEGRATION AND MANAGEMENT

CROSS-REFERENCE TO RELATED APPLICATIONS

This application claims full benefit of and priority to U.S. Provisional Patent Application No. 61/539,588 entitled "Virtual Machine (VM) Realm Integration and Management", which was filed on Sep. 27, 2011 and which is incorporated fully herein by reference.

TECHNICAL FIELD

The present invention relates to cloud computing, parallel processing, distributed computing, fault tolerance, load balancing, dynamic load and volume elasticity based upon application-level demand algorithms and more particularly, relates to the ability to provide both virtualized and physical infrastructure management at the cloud application and application cluster level with an increase in effectiveness, speed and efficiency of such management.

BACKGROUND INFORMATION

Cloud computing is a method for providing convenient, on-demand network access to a shared pool of configurable computing resources, which can be rapidly provisioned and released with minimal management effort or service provider interaction. Cloud and networked computing provides computation, software, data access, and storage services while not requiring the user know the physical location or the configuration of the provided systems. Cloud computing allows a user to rapidly grow or shrink their network usage without requiring changes in local systems, thereby making cloud computing convenient and simple to use by the end user. Cloud Computing management systems focus on auto-scaling at the virtual machine level.

The following Key Terms and Definitions are provided as general reference. The "Host" shall mean a single instance of a "Server" or a "Virtual Machine" that is used for a single internal application or function wrapped by the pneuron software. The virtual machine (VM) is a software implementation of a machine (i.e. a computer) that executes programs like a physical machine. The VM is also described as infrastructure virtualization. The VM system provides a complete system platform which supports the execution of a complete operating system (OS). A hypervisor or virtual machine monitor is the software layer providing the virtualization. A hypervisor can run on bare hardware (Type 1 or native VM) or on top of an operating system (Type 2 or hosted VM). A Hypervisor software layer provides monitoring and diagnostic information and has proven successful for providers such as VMWare®.

Realm is a collection or group of hosts (VMs, physical servers or any combination of either) dynamically and logically organized to maximize specific application or applications processing and load distribution. The term "units of work" refers to initiated atomic level transactional and application requests from existing or third party applications. The term "realm management" refers to the host's ability to start, stop, expand or decrease in capacity, thereby incorporating them into an automated and distributed and application-demand elasticity working environment.

Typically, new hosts are added when system load is heavier or an increase in processing capacity is needed, in order to maintain high throughput and business maintenance, and are removed when system load is lighter, in order to reduce operating costs. Current cloud computing platforms provide a scaling elasticity capability at the total VM level and do not have visibility into specific applications that are processing on the VM. A VM can include one or multiple applications that are using VM-level resources. The "realm" is managed by a collection of dispatcher and worker nodes associated with a cluster—a combination of functions that can be combined and configured with specific application and VM processing rules to any level of complexity and specification.

A cluster can be defined with or without a realm and a realm only need be defined if the pneuron server is being required to start and stop nodes automatically. Each cluster that identifies a realm should specify a different realm name. The realm name is a human-readable unique identifier for the realm. A Cluster Group is self-defined collection of application nodes, either VMs or physical servers (referred as "hosts" hereunder), organized into a discrete set of application functions, tasks, and processing instructions. The cluster can be a set of pneurons defined to carry out a particular workflow, possibly including multiple instances of those pneurons to provide parallel processing for high throughput and redundancy for high availability.

Clusters are organized into multiple cluster groups, which include one or more applications. Each cluster can have configured parameters and behavior characteristics that are specific to one cluster. The flexible configuration model enables different application clusters to be tailored based upon specific application processing requirements. The clusters are dynamic and reform whenever there is a change in either the health of an existing VM or the addition of a new VM into the cluster.

A node is a machine running the pneuron server and particular pneurons. There can be one or more different types of nodes, such as, but not limited to, the following: a dispatcher node, a worker node, a master dispatcher node, a slave dispatcher node, a permanent node, and a transient node, for example. The dispatcher node is a node running a specialized dispatcher pneuron or cluster manager within a cluster for a specific application or group of applications. The worker node occurs within a cluster and is a node that is not running a dispatcher pneuron, but is instead running other application functions encapsulated into pneurons.

Units of work are sent through an application programming interface (API) to the dispatcher for workload evaluation and process execution. The dispatcher pneuron (or node) utilizes durable queues as work requests are initiated, evaluates the queue and sends units of work or messages to the worker instance queues based on how the workflow is defined for the cluster. The master dispatcher node responsibility is negotiated initially when the system is started and the existing dispatchers agree that one dispatcher will become the primary. Once the negotiation occurs, the primary or master dispatcher manages all processing with the other dispatchers shadowing in a standby mode. The master dispatcher controls the cluster, including distribution of units of work or messages to particular worker nodes. A cluster cannot distribute units of work without a master dispatcher. All incoming units or work are held in a pending queue until the cluster is formed and the master dispatcher is available. If the current master dispatcher becomes inoperative, the cluster dynamically reforms and the slave dispatchers negotiate amongst themselves to select one to act as the new master dispatcher. A cluster can be defined, and can operate, with no slave dispatchers, in which case, the cluster stops performing any work if the master dispatcher becomes inoperative. The permanent node is a node that is not automatically started and stopped by the pneuron software but remains as permanent component in the cluster. In contrast, the transient node is a node that can be automatically started and stopped by the pneuron software. The transient nodes are managed within an overall elasticity pool and are eligible for participation in multiple application clusters based on demand and elasticity requirements. The pneuron software does not, however, start and stop transient dispatcher nodes, only transient worker nodes.

Typically, a transient node is a virtual machine (VM) running on a host server. Finally, a subnet is a partial pneuron workflow which incorporates one or more pneurons all working on a single worker node. Each subnet is capable of executing its defined workflow on the specific VM or remote worker instance. All subnets within a cluster must have the identical set of identically connected and configured pneurons, except that each subnet runs on a different worker node. All subnets must end with a Complete Message pneuron. The Complete Message pneuron notifies the dispatcher or units of work completion and updates the server queue.

The realm node configuration defines the processing characteristics, properties, and role of the node within a cluster, i.e. "dispatcher" or "worker". The pneuron software does not start and stop dispatcher nodes automatically, only worked nodes. The only exception is a loss of service by the current master dispatcher and this will result in the overall cluster being dynamically reformed. The realm manages the overall application VM group for targeted application clusters. The realm node configuration manages the processing model for each VM within the realm. The pneuron software does not start and stop permanent nodes automatically, only transient nodes.

Realm actions are configured and enable different elasticity and provisioning scenarios. The VM increase scenarios are: Create VM, Provision pneuron application, and start application on remote worker. The creation model can be configured to include just provisioning and starting a pneuron remote instance or creating a new VM, followed by provisioning. The VM removal scenarios include: Stop pneuron application, remove pneuron application, and remove VM. The removal model can be configured to include just stopping pneuron and removing the instance or completely removing the VM. In addition, the realm manager has been integrated using Java Management Extensions (JMX) and Message Beans (MBeans).

Requests for increase and decrease in VMs occurs by publishing the notifications to the Realm MBean, which is monitored by the cloud management system and will apply the recommendations. The Realm MBean is a non-intrusive approach, when direct interaction with the hypervisor is not preferred. The realm action requests is one of three values that provide manual override of the pneuron server's algorithm for starting and stopping transient worker nodes, regardless of other factors such as system load that made be influencing the algorithm. The action request field for each node if one of these three values, i.e. NULL, meaning manual override; STOP, meaning stop the node; or START, meaning start the node. As soon as a non-null action request is processed, the action request field is automatically reset to NULL.

A Cloud and Network Management System is an integrated system with the ability to provide cloud topography information, access and alignment of virtualized or cloud environment. The pneuron "Administration" application is a visual graphical user interface (GUI) and enables users to define and configure security, users, realms, realm nodes, and other global information. The realm and realm node composition, including the realm elasticity algorithms and models and the specific worker processing characteristics, are defined with the Administration application. The pneuron "Design Studio" is a visual graphical user interface (GUI) application development toolset and enables users to define and configure pneuron application clusters and workflows, including pneuron components and functions, their characteristics, and properties, and organize the business rules and workflow into discrete processing models at the application level. As part of the Design Studio configuration, users are able to associate the realm with the application cluster when configuring the dispatcher. Users are able to connect these functions to each other to build compound or hybrid products, add new functions to existing applications or businesses and allows the deployment and management of all these functions, workflows, products, applications and business models to both internal physical server environments, or the internal and external cloud. The Realm Manager highlighted below functions in both physical server and virtualized environments seamlessly and interchangeable. The deployment model can include completely internal fixed nodes, complete virtualized infrastructure, or a hybrid of internal fixed nodes and virtualized nodes. For sake of this explanation Virtual Machines will be used as the example host.

VMs are advantageous in that multiple OS environments can co-exist on the same computer, in strong isolation from each other. The VM can provide an instruction set architecture (ISA) that is somewhat different from that of the real machine, which can include application provisioning, maintenance, high availability and disaster recovery. VMs also have disadvantages, including the fact that a VM is less efficient than a real machine when it accesses the hardware indirectly. Also, when multiple VMs are concurrently running on the same physical host, each VM may exhibit a varying and unstable performance (Speed of Execution, and not results), which highly depends on the workload imposed on the system by other VMs, unless proper techniques are used for temporal isolation among VMs.

VMs operate at the overall Operating System (OS) level and do not operate or manage specific applications or clusters. VM utilization, elasticity, and optimization models are at the overall OS and are limited to the cloud management and hypervisor capabilities implemented for the specific vendor. Traditionally, the methodology has been simple load sharing and auto-scaling, wherein a first virtual machine is used and filled and then a second virtual machine is added, adding any needed additional virtual machines as each one is filled. Additionally, visibility into cluster group and application level processing has been limited. Traditional approaches that do offer some clustering and elastic computing, do so as either a hardware or operating system level.

The Pneuron solution (provided by the present invention) on the other hand provides visibility and elasticity at the application-cluster level and is hardware, technology and operating system independent. The application-level elasticity provides "fine-grained" demand management and enables flexible adjustments specific to applications or a group of applications within a cluster. This level of elasticity is not possible with traditional cloud management systems and enables more accurate and targeted demand management relative to how individual applications are performing and not at an aggregate VM level. This is important with regards to the Realm Manager disclosed herein. Finally, the ability to optimize at the cluster group and application level processing is limited. These disadvantages and limitations, as well as others, are why a unique and innovative process is needed.

Accordingly, what is needed is a model, configuration flexibility, and management that are application-centric as a process and technology for managing cloud-based computing, networked servers or a combination with respect to the virtual machines and the associated functions, applications and activities using virtualized infrastructure. The focus should be on providing a highly elastic and automated process model for orchestrating distributed host utilization and elasticity within a cloud computing paradigm and virtualized infrastructure at the specific application or cluster level and will provide a more effective and responsive approach for application processing, resource utilization and overall execution. The process will solve major limitations with respect to application-level processing visibility, monitoring, adjustments in capacity and utilization models, and enable flexible interfaces to cluster application processing groups and the associated performance of functions that such processes are aligned and managed against. The improved model and manager should feature added intelligence and logic, such that virtual machines can be loaded by various client determined parameters thereby enabling highly specific client management of load distribution based on cost, risk or other configurations.

SUMMARY

The present invention features a platform (system) and method that implements a configuration and algorithmic based application and process for enabling multiple VMs, networked servers (hosts) or combinations of these to be organized and managed in application-level groups or realms in real time and against specific configurable metrics.

In one embodiment, the present invention features a cloud management system for enterprise applications. The cloud management system comprises two or more configuration policies as well as a realm manager, wherein the realm manager is responsive to the two or more configuration policies and configured to allow for input, setup and configuration of the two or more configuration policies through the use of a design studio application, and wherein the realm manager is configured to generate a client specific algorithm based upon the two or more configuration policies. The system also includes an automatic demand elasticity and fault tolerance manager, responsive to the realm manager, and configured for enabling reallocation of the client specific algorithm in response to either a change in one or more of the two or more configuration policies or an occurrence of an external event.

The cloud management system may further include an abstract interface implemented for the cloud management system and including specific cloud management adapters established for the cloud management system, wherein the abstract interface and the specific cloud management adapters are configured to enable consistent processing logic while also extending new cloud management interfaces with adapter programs. Also included may be a virtual machine manager or hypervisor, configured to inform a client that a single physical server has been re-configured into multiple virtual servers.

The design studio may further include a design studio properties editor configured to access properties, preferences and activities within the cloud management system, wherein a new client specific algorithm can replace the client specific algorithm without disruption to cloud management or the hypervisor through direct interaction with the realm manager using the design studio properties editor. The hypervisor may give information about the attributes of particular servers and receive information from the cloud management system.

The two or more configuration policies include one or more of the following factors: load, cost, risk, load by cost, load by risk, time available, and future load projections while the cloud management system may further comprise a network configurator, configured to receive information from the realm manager and to distribute load as determined by the realm manager.

The cloud management system may also comprise a dispatcher configured to receive the load distribution information from the network configurator; a clustering manager, configured to provide clustering and automatic and dynamic load elasticity against volume, load or any other processing requirement, wherein the clustering manager forms clusters and breaks down clusters depending on requirements and requests for load, volume and performance; a queue manager configured to manage load of each server across a plurality of servers in order to accomplish load distribution as determined by the realm manager; a load manager configured to manage load on each individual server; and a distribution manager, configured to manage physical movement of each load.

The dispatcher may include master and slave dispatchers configured to distribute work requests to multiple participating servers for remote processing and wherein the dispatcher, the cluster manager, the queue manager, the load manager and the distribution manager are configured using the design studio and monitored and managed by an enterprise content manager or a monitoring application programming interface.

The design studio enables a user to create and configure a host realm, host realm nodes and to register a virtual machine node to an associated host realm using the two or more configuration policies determined by the user, wherein the design studio creates code to implement the two or more configuration policies determined by the user. The design studio opens the realm manager and distributes load based on the user determined configuration policies.

The present invention also features a method for virtual machine realm integration, wherein the method comprises the acts of: configuring a realm manager with two or more client determined configuration policies; allowing input, setup and configuration of the two or more client determined configuration policies through the use of a design studio application program; generating a client specific algorithm based upon the two or more client determined configuration policies; and enabling reallocation of the client specific algorithm in response to a change in one or more of the two or more client determined configuration policies or the occurrence of an external event.

The method includes wherein the configuration policies determine when a realm member is created, started, stopped or removed, and wherein the configuration policies include one or more of the following: load, cost, risk, time available, future load projections, processing capacity availability, cost of CPU processing, location based on risk, importance to business continuity priority requirements, disaster recovery strength and priority, geographic location of VM, and physical server location aligned to intellectual property.

The method may further comprise a system including a network configurator, configured to receive information from the realm manager and to distribute load. In this embodiment, the method may further comprise the acts of: creating nodes with an automatic distributed net cloud node instance, wherein the nodes are created when volume increases and are controlled by the realm manager; and removing nodes upon the occurrence of the detection of a decrease in load, wherein opening and closing of virtual machines to handle changes in load allows one or more clusters to be reformed automatically.

The method may include wherein a malfunction causes automatic reallocation of one or more loads by the realm manager. The method may further include a system including an application cluster group which includes one or more of the following: a dispatcher, a cluster manager, a queue manager, a load manager and a distribution manager, the application cluster group operating in a wait mode until a unit of work is received. The application cluster group may include a master dispatcher configured to receive and process work requests and distribute units of work.

The method may further comprise the acts of: notifying a cloud management platform and a hypervisor by the realm manager when it is necessary to increase or decrease the virtual machine levels, wherein the realm manager notification process enables the real manager to create a new virtual machine, start a new virtual machine, deploy a new image, start a new process, remove a virtual machine, record virtual machine utilization statistics and other virtual machine management level protocols. The realm manager may include a virtual machine management algorithm configured to allow the realm manager to process any number of load balancing and specialized approaches based on the two or more client determined configuration policies, wherein the virtual machine management algorithm includes an abstract interface that enables the virtual machine management algorithm to be highly client specific and adaptable over time by adding or changing of configuration policies in response to load, cost, risk or any other changing client configuration.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention.

DESCRIPTION OF THE DRAWINGS

These and other features and advantages of the present invention will be better understood by reading the following detailed description, taken together with the drawings wherein.

DESCRIPTION OF THE INVENTION

Figure 1:
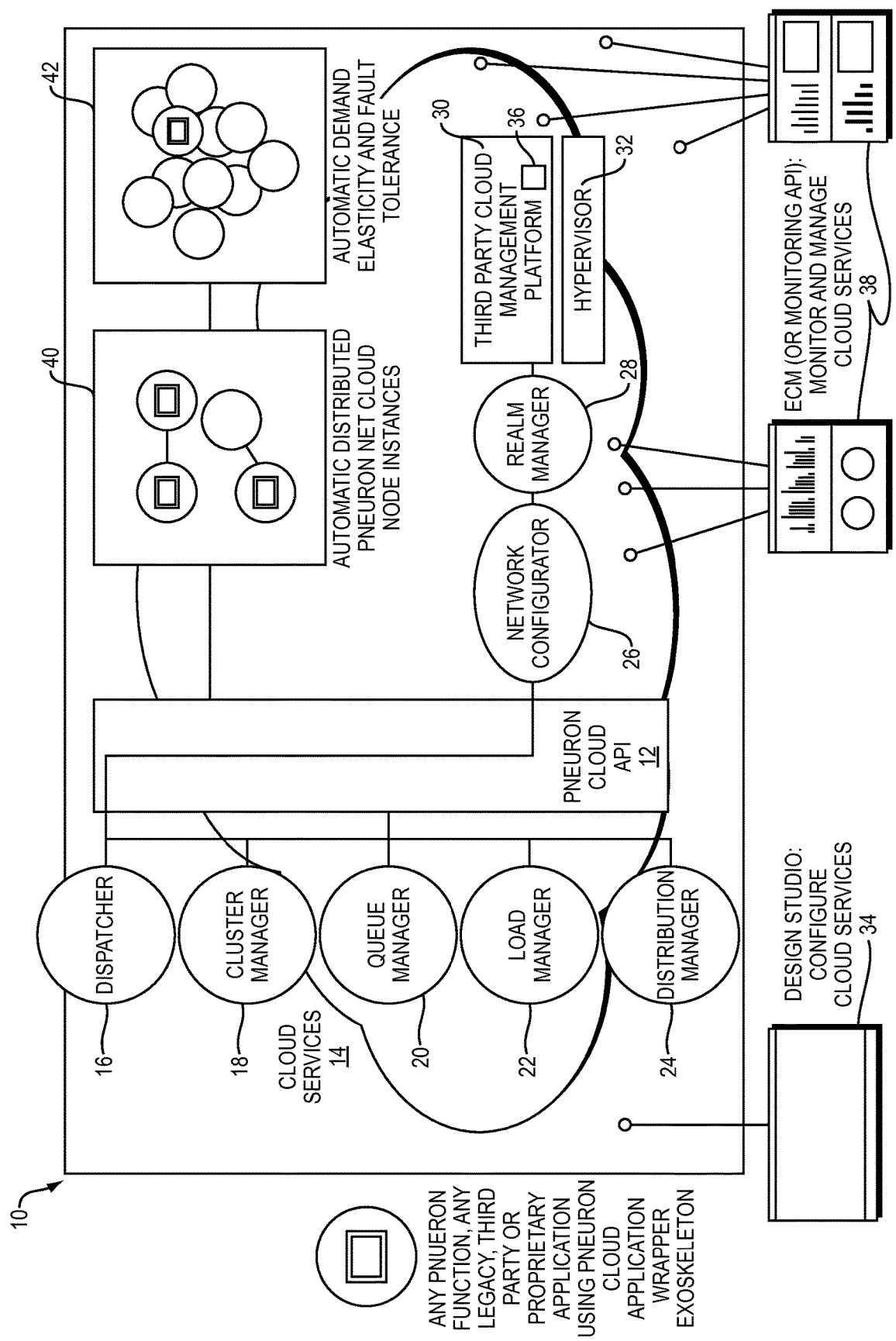
FIG. 1 is a schematic view of the run time cloud architecture components with relative positioning of the virtual machine realm manager.
Figure 2:
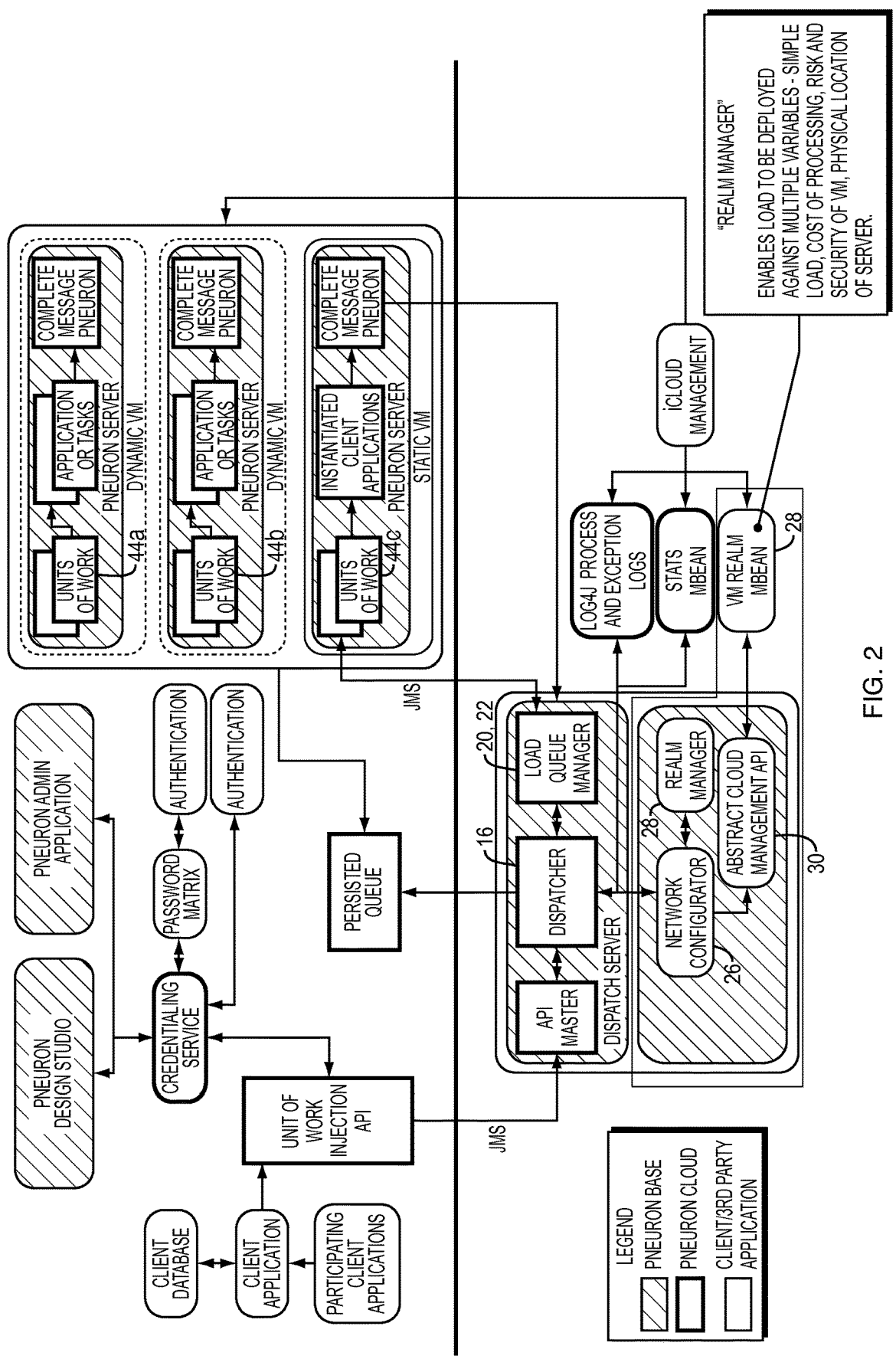
FIG. 2 is a schematic view of the architecture integration cloud enabled legacy application with cloud run time architecture.
Figure 3:
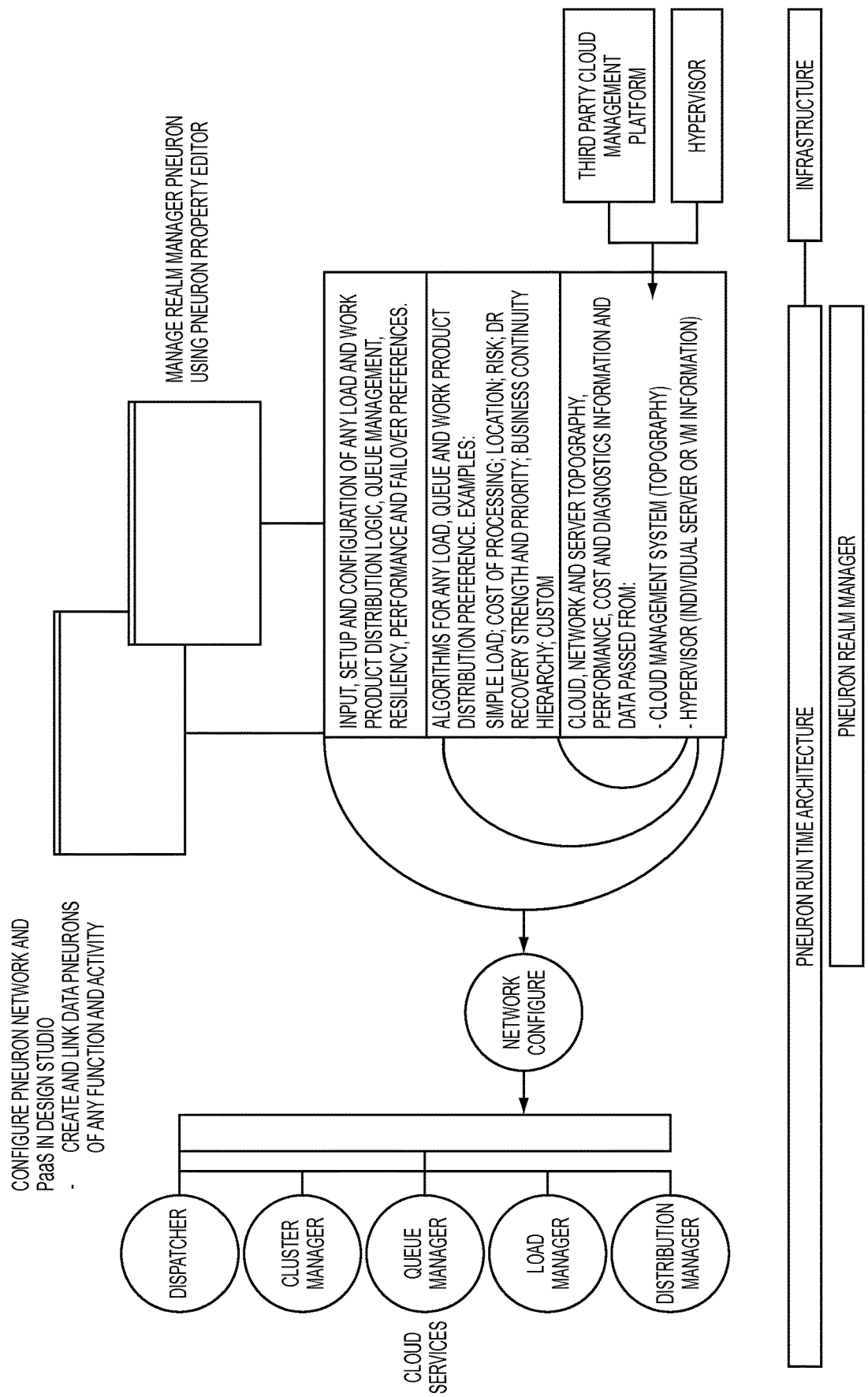
FIG. 3 is a schematic view of the realm manager interfaces and internal workflow.

A representative platform or cloud architecture 10, FIGS. 1, 2 and 3, on and with which may be utilized the present invention allows multiple VMs to be organized into VM groups or realms in real-time and against specific configurable metrics. As shown in FIG. 1, cluster or Virtual Machines and physical servers are managed by the same framework. Also shown are the relative position of the realm manager 28 in this architecture and the integration of enterprise required security and deployment pre-requisites. The realm manager 28 is located within the pneuron and may be managed by a pneuron property editor.

These VM, networked server or combination groups have defined utilization and processing models and are associated with application level clustering. The host realm nodes or specific VMs have configured process policies and algorithms and are configured as permanent or transient. Using an abstract model, the processing behavior at both the host realm and the host realm node level is configured. The functions are specified on the inside, wherein the inside features specified and dedicated functionality. The outside all looks the same regardless of the internal functionality. The policies properties are maintained as meta-data instructions within the application database or cloud application programming interface (API) 12. The Cloud API 12 is utilized to create applications in the cloud computing market, thereby allowing software to request data and computations from one or more cloud services 14 through a direct or indirect interface.

During runtime execution, the application cluster groups host realms, and host realm nodes are synchronized together with the VM overall processing model, thereby optimizing the development and implementation of the information technology. Based upon the configuration policies realm and realm members are automatically created, started, stopped, and removed. The configuration policies include, but are not limited to simple processing capacity availability as well as more complex data including cost of CPU processing, location based on risk, importance to business continuity priority requirements, disaster recovery strength and priority, geographic location of VM or physical server aligned to IP, and any other custom requirements. The configuration policies are fully customizable based on importance and any number of client custom preferences and logic. The invention provides for automated optimization and processing at the application and application cluster levels 14 using not just load as the key guidance for volume distribution and VM management, but also cost, time available, future load projections, risk and other client specific variables and parameters. The elasticity model has been implemented as an interface and enables custom algorithms to be encapsulated and incorporated directly into the realm load management models.

The various configuration policies and parameters are used to generate client specific algorithms using a configuration approach. The realm manager 28 handles the input, setup and configuration of any load and work product distribution logic, queue management, resiliency, performance and failover preferences. The realm manager 28 provides algorithms for any load, queue and work product distribution preference by including all configuration policies. The cloud, network and server topography, performance, cost and diagnostics information and data is passed from the cloud management system (topography) and hypervisor (individual server or VM information). Multiple models exist and are configured for VM hosts, including known hosts, a block of VMs, and dynamic VM host establishment.

Clusters are automatically reformed and synchronized based upon the systemic adjustments to the host realm and its nodes. Interaction with the VM cloud management 30 and hypervisor 32 can occur through different modes, including direct API with the hypervisor 32 and posting of VM change notifications to the cloud management 30 or hypervisor 32. The cloud management can be any third party platform, such as those provided by, for example, Red Hat™ or Amazon™. An abstract interface has been implemented for cloud management systems and specific cloud management adapters are established for each cloud management system. This approach enables the configuration and processing logic to be consistent while easily extending new cloud management interfaces with adapter programs. The hypervisor 32, also known as the virtual machine manager, serves to inform the client that their single physical server is now multiple virtual servers.

The platform or runtime architecture 10 eliminates or mitigates host issues and limitations that are present in current cloud architecture. For example, the virtual machine efficiency is improved by augmenting the application level clustering and enabling the cloud management to have discrete visibility into application level resources and utilization. Elasticity and demand models are more fine-grained and enable process and load optimization at the application or application cluster level. The flexibility here also enables different applications and processing models to be allocated with the proper VM resources, saving process costs and smoothing demand and utilization at a level not possible with current cloud management applications. This is possible because the application level clustering is done automatically and dynamically. Performance variations are managed and stabilized at the physical host through optimal and policy-based workload evaluation. Visibility and control is provided at the specific applications or clusters within the VM. The platform enables host utilization, elasticity, and optimization models at the specific applications or clusters within the host. Visibility is optimized into cluster groups and application level processing is limited. The ability to optimize at the cluster group and application level processing is enabled.

The host realm optimization, elasticity, and utilization models can be readily adjusted with new algorithms without any disruption to the cloud management 30 or hypervisor 32 through direct interaction with the Realm Manager 28 using the pneuron Design Studio Properties Editor 34. The design studio is a software access window into all properties, preferences and activities within the pneuron. The hypervisor 32 gives information about the attributes of particular servers and receives information from the cloud management platform 30.

The present embodiment enables an added level of intelligence that allows for allocation of resources based not only on load, but also on load by cost, load by risk, and any other desired configurations. The realm manager 28 contains the logic that tells the pneurons to do their work. The realm manager 28 balances all of the configuration policies of a particular client and provides a client preferred cloud distribution. The realm manager 28 also provides real time correction for distribution when circumstances change. For example, if the preferred servers crash, re-allocation will occur automatically, which is ideal for disaster recovery.

The network configurator 26 takes the realm manager information and has all available processing necessary to distribute load as determined by the realm manager 28. The dispatcher 16 takes the information from the network configurator. The cluster manager 18 then provides clustering and automatic and dynamic load elasticity against volume, load or any other processing requirement. Clusters automatically form and break down depending on requirements and requests for load, volume and performance. The queue manager 20 manages the work load of each server across all servers necessary to accomplish the preferred allocation of resources. The load manager 22 manages the load on each individual server. The distribution manager 24 manages the physical movement of the load.

The automatic distributed net cloud node instance 40 creates nodes, which are an automatic replication of a pneuron. This process is established when volume increases. Multiple nodes replicate to deal with increase in volume. The realm manager controls when this occurs. The automatic demand elasticity and fault tolerance 42 establishes an elastic environment, thereby allowing for opening and closing of virtual machines to handle load. This process is accomplished automatically. For example, whenever something is not functioning properly, the load is automatically reallocated. The reallocation occurs based on the logic provided by the realm manager 28.

The runtime architecture 10 functions to configure and define the host Realm and host realm nodes. Using the Design Studio 34, the user creates and configures the host realm and host realm Nodes, registering the VM nodes to the associated host realm. The host realm and nodes characteristics, algorithms, and policies are configured using the Design Studio 34. The design studio 34 enables a user to write in plain language what they want the architecture to do, and which configuration policies are of which importance, and the design studio creates code to implement these preferences. This process is accomplished via the design studio 34, which is able to create and link pneurons by opening the realm manager 28 where all of the cloud management is located. The design studio 34 can then distribute load based on one or more of the configuration policies and parameters. In this way, the realm manager 28 adds a level of intelligence to the process accomplished by the design studio 34 in order to implement the desired configuration.

The host realm is then associated with the application cluster or cloud services 14. The application clusters 14 are configured using the design studio 34. The application cluster 14 includes Master and Slave Dispatchers 16, who distribute work requests to multiple participating hosts for remote processing. A network is established and describes the application cluster definition and its processing hosts and tasks. As part of the configuration, the Master and Slave Dispatcher 14 configuration properties are linked to the host realm. This linkage enables the application cluster 14 and the hosts to be mapped into a logical and aggregate processing group. The ECM or monitoring API 38 monitors and manages the cloud services 14.

Upon deployment of the Realm and application cluster 14, the application cluster group 14 is formed dynamically based on the availability of the Host Realm and VM nodes and operates in a wait mode until units of work 44 are received. The units of work 44 can be any function, application, message, command, portfolio or process. The initial configuration is based upon the permanent or static VMs. The startup of the base processing model is configured and linked to the cloud computing manager or cloud management platform 30 and hypervisor 32. The runtime platform 10 includes a master dispatcher 16 that receives and processes work requests and distributes units of work 44*a*, 44*b*, 44*c*, etc. to participating remove instances residing on distributed VMs.

The runtime platform 10 also includes worker instances, which are distributed VMs operating within the application cluster and Host Realm per defined configuration. Further, the runtime platform 10 includes a load balancer and a queue manager 20, which operates at the cluster level distributing work requests to the participating VMs and applying the configured work distribution model. The Realm Manager 28 provides the distribution, queue and prioritization instructions to these pneurons in real time through both gaining real time information from the cloud management system 30 and hypervisor 32. The realm manager 28 then enables and manages a constant and uninterrupted efficiency within the cloud environment and the assets in the cloud for maximum leverage of enterprise assets aligned to client preferences and requirements.

The Host Realm manager 28 monitors the VM workload based on the configured policies. The host Realm manager 28 identifies variances in VM workload based on the configured algorithms and identifies a need to increase or decrease the processing levels. The Realm manager 28 then notifies the network configurator 26 when workload levels meet high and low policy thresholds. The Realm manager 28 also notifies the cloud management platform 30 and hypervisor 32 through different configured integration protocols to increase or decrease the VM levels. As part of the notification process, the functions can include: creating a new VM, starting a new VM, deploying a new image, starting a new process, stopping an existing process, removing an image, removing a VM, recording VM utilization statistics and managing the process state of the Realm.

A network configurator 26 interacts with the host realm Manager 28 and the Master Dispatcher 16 and Load Balancer or load manager 22 to facilitate changes based on the host realm Manager 28. The network configure 26 maintains consistency and updates of the overall configuration.

The realm manager 28 also features a VM management algorithm 36. The unique VM Management Algorithm 36 allows the realm manager 28 to process any number of load balancing and specialized approaches based on preferences that the user can align and decide upon. Receiving VM topography information and diagnostics from the cloud management system the Realm Manager VM Management Algorithm 36 enables the use and distribution of Virtual Machines against simple load management preferences through to complex usage and distribution preferences aligned against cost of processing, type of server, location of physical hardware, risk or CPU and IO speed. The host management algorithm 36 enables the use and distribution of host based upon the configuration policies. Each host management algorithm 36 is therefore highly client specific and adaptable over time.

The abstract interface for the algorithm can easily add any preference aligned against client or market demand for host usage, network and cloud asset management and workload distribution. When VM nodes are increased or decreased, the components interact together and the cluster is reformed automatically. The ability of the realm manager 28 to automatically understand the virtual topography of the cloud or enterprise network 10, and, as a result, distribute functions, products, services or activities automatically within client defined efficiency preferences is a distinct advantage over all prior art VM systems and processes.

The present invention provides for a platform that allows for quick, cost effective and simple cloud orchestration or network leverage of enterprise applications. As a result, the applications are propelled to real time parallel processing, high availability, load balancing and cloud virtualization all based on configuration determinations including load, cost, risk or any other deployment preference.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention which is not to be limited except by the allowed claims.

The invention claimed is:

1. A non-transitory computer readable medium including computer program instructions to cause a computing device to perform steps in a process, comprising:
    defining a realm of at least one application cluster group that includes a worker that encapsulates an application function capable of:
    performing a processing task as part of a defined workflow of processing tasks and that spans at least one virtual machine hosted on one or more physical nodes, wherein the composition of the application cluster group is defined by the processing requirements of the application function;
    managing, by a realm manager of the application cluster group and based on a workload configuration policy, a workload level of each virtual machine;
    adjusting a number of virtual machines hosted on the one or more physical nodes in response to a request from the realm manager and based on at least one of monitoring information that pertains to the at least one virtual machine and that is obtained by a virtual machine monitor and diagnostic information that pertains to the at least one virtual machine and that is obtained by a virtual machine monitor;
    allocating work, by a distribution manager, to adjust a workload of each application cluster group within the realm;
    managing, by a network configurator and in response to information received from the realm manager, a processing capacity load of each application cluster group within the realm;
    adjusting a number of workers within the application cluster group in accordance with processing needs determined by a cluster manager of the application cluster group;
    receiving, at a work queue, a unit of work from a client application;
    managing the work queue with a queue manager of the application cluster group and in accordance with a queue configuration policy;
    sending, by a current master dispatcher of the application cluster group, the unit of work to the worker, the current master dispatcher being negotiated from a plurality of slave dispatchers;
    performing the processing task encapsulated by the worker on the unit of work in accordance with a defined workflow;
    returning a fully processed unit of work to the client application; and
    dynamically reforming the application cluster when the current master dispatcher becomes inoperative by the plurality of slave dispatchers negotiating amongst themselves to select one of the slave dispatchers to act as the new master dispatcher.

2. The non-transitory computer readable medium of claim 1 wherein the application cluster group includes two or more workers, each of which encapsulates an application function, and all of which are arranged with respect to each other to implement the defined workflow of processing tasks.

3. The non-transitory computer readable medium of claim 2 wherein the application cluster group is configured to perform parallel processing tasks.

\* \* \* \* \*